United States Patent
Gubenko et al.

(10) Patent No.: US 12,489,542 B2
(45) Date of Patent: Dec. 2, 2025

(54) APPARATUS FOR OPTICAL DEMULTIPLEXING

(71) Applicant: Innolume GmbH, Dortmund (DE)

(72) Inventors: Alexey Gubenko, Dortmund (DE); Aleksei Borodkin, Dortmund (DE); Vladislav Bougrov, Dortmund (DE)

(73) Assignee: INNOLUME GMBH, Dortmund (DE)

( * ) Notice: Subject to any disclaimer, the term of this patent is extended or adjusted under 35 U.S.C. 154(b) by 263 days.

(21) Appl. No.: 18/482,579

(22) Filed: Oct. 6, 2023

(65) Prior Publication Data
US 2025/0119228 A1    Apr. 10, 2025

(51) Int. Cl.
*H04J 14/08*    (2006.01)
*G02B 6/122*    (2006.01)
*H04Q 11/00*    (2006.01)

(52) U.S. Cl.
CPC ............ *H04J 14/08* (2013.01); *G02B 6/1228* (2013.01); *H04Q 11/0005* (2013.01); *H04Q 2011/0007* (2013.01)

(58) Field of Classification Search
CPC ........ H04J 14/08; H04J 14/083; H04J 14/086; G02B 6/1228; H04Q 11/0005; H04Q 2011/0007; H04B 10/2563; H04B 10/516
See application file for complete search history.

(56) References Cited

U.S. PATENT DOCUMENTS

| 5,493,433 A | 2/1996 | Prucnal et al. |
| 8,538,268 B2 | 9/2013 | Izumi |
| 2002/0196497 A1* | 12/2002 | LoCascio ................ B82Y 5/00 370/535 |
| 2012/0063784 A1* | 3/2012 | Izumi .................... H04J 14/086 398/101 |
| 2014/0036937 A1* | 2/2014 | Doerr .................... H04B 10/40 370/535 |

FOREIGN PATENT DOCUMENTS

| JP | 2005005897 A | 1/2005 |
| WO | 2022162477 A1 | 8/2022 |

OTHER PUBLICATIONS

Toliver, P. et al., "Ultrafast multihop packet-switched optical time-division multiplexing: components and systems," Optical Engineering, Society of Photo-Optical Instrumentation Engineers, vol. 37, No. 12, Dec. 1, 1998, 8 pages.
ISA European Patent Office, International Search Report Issued in Application No. PCT/EP2024/077599, Dec. 13, 2024, WIPO, 5 pages.

* cited by examiner

*Primary Examiner* — Hibret A Woldekidan
(74) *Attorney, Agent, or Firm* — McCoy Russell LLP (57) ABSTRACT

An apparatus for optical demultiplexing comprising an optical splitter, at least two semiconductor optical elements (SOE's), and an optical gating line arrangement optically coupled to each of the at least two SOE's for altering optical transmission properties of the corresponding SOE.

18 Claims, 8 Drawing Sheets

APPARATUS FOR OPTICAL DEMULTIPLEXING

FIELD

This disclosure relates to optical time-division multiplexing, and optical time-division de-multiplexing in particular.

BACKGROUND

For optical demultiplexing, polarization controllers and/or circulators are presently used. However, this is not an ideal solution.

SUMMARY

According to a first aspect, an apparatus for optical demultiplexing is provided, e.g. as an optical time-division multiplexing receiver. The apparatus comprises an optical splitter configured for receiving an optical time-domain multiplexed (OTDM) signal and transmitting the OTDM signal separately along a first signal path and a second signal path. This allows the OTDM signal to be provided as a single signal with an unambiguously defined waveform in time and split into two or more copies of the OTDM signal, which may be subjected to demultiplexing at the same time or at different times.

The apparatus also comprises at least two semiconductor optical elements, comprising a first SOE configured for receiving the OTDM signal from the first signal path and a second SOE configured for receiving the OTDM signal from the second signal path. This allows the OTDM signal at different signal paths, i.e. OTDM sub-signals, to be separately processed for demultiplexing at different SOE's—at the same time or at different times.

The apparatus comprises an optical gating line arrangement comprising an input end for coupling to an optical gating source for receiving an optical gating signal. This allows the optical gating signal to be provided as a single signal with an unambiguously defined waveform in time. The optical gating line arrangement is optically coupled to each of the at least two SOE's for altering optical transmission properties of the corresponding SOE for the OTDM signal by the optical gating signal. In particular, a time-varying optical gating signal allows the optical transmission properties of the at least two SOE's to be varied in time allowing demultiplexing of the OTDM signal as different parts of the OTDM signal can be transmitted through different SOE's of the at least two SOE's.

A first difference is different from a second difference to facilitate a time delay for demultiplexing the OTDM signal. The first difference corresponds to a difference between an optical distance for the OTDM signal from the optical splitter to the first SOE and an optical distance for the optical gating signal from the input end to the first SOE. The first difference may thus represent the difference for the first and the second SOE receiving the OTDM signal. The first difference being zero may be understood as the OTDM signal arriving at the first SOE and at the second SOE at the same time so that the time-varying waveform of the OTDM signal assumes the same value at the first SOE and at the second SOE at each moment. The second difference corresponds to a difference between an optical distance for the OTDM signal from the optical splitter to the second SOE and an optical distance for the optical gating signal from the input end to the second SOE. The second difference may thus represent the difference for the first and the second SOE receiving the optical gating signal. The second difference being zero may be understood as the optical gating signal arriving at the first SOE and at the second SOE at the same time so that the time-varying waveform of the optical gating signal assumes the same value at the first SOE and at the second SOE at each moment. In the present solution, the first difference can be made different from the second difference so that the optical gating signal probes the OTDM signal at different parts at the first SOE and at the second SOE.

Each of the at least two SOE's has a length dimension and a width dimension. Each of the at least two SOE's may be configured for the OTDM signal to be received along the length dimension of the corresponding SOE and the optical gating signal to be provided across the width dimension of the corresponding SOE. This is in contrast to a circulator setup, where signals are returned to functional elements, such as the SOE's, along the signal path in the length dimension. The solution allows flexibility in gating line construction, in particular for adjusting timing of the optical gating signal for different SOE's of the at least two SOE's.

Above we refer to "the at least two SOE's" and "the first SOE" and "the second SOE". It should be understood that the at least two SOE's may consist of two SOE's, i.e. the first and the second SOE, but it may alternatively comprise one, two, three or more additional SOE's, e.g. a third SOE, a fourth SOE, a fifth SOE and so on. What is said here regarding the first and the second SOE may be applied to these additional SOE's as well. They can be seen to provide additional channels for demultiplexing, in addition to the first SOE and the second SOE, and their working principle may thus be the same. As an example, the first SOE may be the SOE configured for first receiving the optical gating signal and/or the second SOE may be the SOE configured for last receiving the optical gating signal.

In an embodiment, the at least two SOE's are saturable absorbers (SA) configured to be saturated by the optical gating signal to facilitate the demultiplexing. This can facilitate the altering of the optical transmission properties of the corresponding SOE for the OTDM signal by the optical gating signal. The corresponding SOE of the at least two SOE's may block, or at least mitigate, the OTDM signal in absence of the optical gating signal. By the effect of the optical gating signal at the corresponding SOE of the at least two SOE's, said SOE as a SA can become saturated and thus transmit a time-varying part of the OTDM signal for demultiplexing the OTDM signal.

In an embodiment, the length dimension of the first SOE corresponds to a first optical length and the width dimension of the first SOE corresponds to a second optical length, the first optical length being larger than the second optical length. This allows more effective interaction between the corresponding SOE, e.g. a SA, and the optical gating signal for altering optical transmission properties of the corresponding SOE for the OTDM signal.

In an embodiment, the optical gating signal is routed from the input end to the second SOE via the first SOE (or vice versa). This allows the optical gating signal to be transmitted along a single optical gating line for altering optical transmission properties of both the first SOE and the second SOE and, optionally, any number of the additional SOE's. Since the SOE's are along the same line, the optical distance for the optical gating signal from the input end to the first SOE is necessarily different from the optical distance for the optical gating signal from the input end to the second SOE. This difference in optical distance may be represented by the optical distance for the optical gating signal from the first SOE to the SOE (or vice versa). This optical distance may be conveniently altered for altering timing of the optical gating signal at the first SOE and at the second SOE. The optical gating signal may be transmitted along the same single optical gating line for altering optical transmission properties of any number of the additional SOE's.

In an embodiment, the optical gating line arrangement and/or the at least two SOE's comprises integrated photonic components. The apparatus can thus be provided on a photonic circuit with the optical gating line arrangement, the at least two SOE's and, optionally, the optical splitter integrated thereupon.

In an embodiment, the at least two SOE's comprises more than two SOE's, in particular at least 3 and at most 64 SOE's. Each of these SOE's may be configured for providing a separate channel for the OTDM signal. The optical splitter may accordingly be configured for transmitting the OTDM signal separately along each of the separate channels.

In an embodiment, the optical gating line arrangement comprises a first waveguide coupling portion for coupling the optical gating signal to the first SOE and a second waveguide coupling portion for coupling the optical gating signal to the second SOE, wherein the first waveguide coupling portion and/or the second waveguide coupling portion comprises a tapered waveguide for spatially spreading the optical gating signal incident on the corresponding SOE. This allows improvements in the altering of the optical transmission properties of the corresponding SOE for the OTDM signal by the optical gating signal. The solution can facilitate increasing of the saturated volume and/or cross-section of the SOE('s), when they are provided as SA's.

In an embodiment, the optical gating line arrangement comprises a first tapered waveguide for spatially concentrating the optical gating signal outgoing from the first SOE and/or a second tapered waveguide for spatially concentrating the optical gating signal outgoing from the second SOE. This allows the optical gating signal to be transmitted as a concentrated signal between SOE's.

In an embodiment, the length dimension of the first SOE is parallel with the length dimension of the second SOE. This allows effective assembly. The length dimensions for all of the at least two SOE's may be parallel, e.g. for three, four, five or more channels.

In an embodiment, the optical gating line arrangement is configured for the optical gating signal to be propagated from the first SOE to the second SOE across a gating direction, the gating direction being non-perpendicular with respect to the length dimension of the first SOE and/or the length dimension of the second SOE. This allows the timing of the optical gating signal at the first SOE and at the second SOE to be altered with the angle as optical distance between the first SOE and the second SOE can be created in two perpendicular dimensions. In a further embodiment, the gating direction is at an angle of at least 45 degrees and at most 135 degrees with respect to the length dimension of the first SOE and/or the length dimension of the second SOE. These angular values allow the same direction to be used for the gating direction and a crossing direction, as defined below, while not increasing of noise for the output signal. In an alternative embodiment, the optical gating line arrangement is configured for the optical gating signal to be propagated from the first SOE to the second SOE (or the vice versa) across a gating direction (in particular along a gating direction such as a straight line), the gating direction being perpendicular with respect to the length dimension of the first SOE and/or the length dimension of the second SOE. In a further embodiment, the gating direction is non-perpendicular but the optical gating line arrangement is configured for the optical gating signal to be propagated from the second SOE to a third SOE across a second gating direction which is perpendicular (in particular along a second gating direction such as a straight line) or the gating direction is perpendicular but the optical gating line arrangement is configured for the optical gating signal to be propagated from the second SOE to a third SOE across a second gating direction which is non-perpendicular. This allows both alternatives to be used for variability within a single set of the at least two SOE's. In a specific embodiment, the gating direction continues as a straight line across all the at least two SOE's, e.g. across three, four, five or more SOE's.

In an embodiment, the optical gating line arrangement is configured for the optical gating signal to be propagated across the first SOE and/or the second SOE across a crossing direction (in particular along a crossing direction such as a straight line), the crossing direction being non-perpendicular with respect to the length dimension of the first SOE and/or the length dimension of the second SOE. This allows the saturation and thus also the timing of the optical gating signal at the first SOE and at the second SOE to be altered with the angle as optical distance for the optical gating signal across the first SOE and/or the second SOE can be altered. In a further embodiment, the crossing direction is at a crossing angle of at least 45 degrees and at most 135 degrees with respect to the length dimension of the first SOE and/or the length dimension of the second SOE. These angular values allow efficient operation while not increasing of noise for the output signal. In an alternative embodiment, the optical gating line arrangement is configured for the optical gating signal to be propagated across the first SOE and/or the second SOE across a crossing direction (in particular along a crossing direction such as a straight line), the crossing direction being perpendicular with respect to the length dimension of the first SOE and/or the length dimension of the second SOE. In a further embodiment, the crossing direction is non-perpendicular for the first SOE and non-perpendicular for the second SOE (or vice versa). This allows both alternatives to be used for variability within a single set of the at least two SOE's. In a specific embodiment, the crossing direction is the same for all the at least two SOE's, e.g. for three, four, five or more SOE's. The non-perpendicular crossing direction allows increasing gating cross-section (in the longitudinal dimension of the corresponding SOE). When the tapered waveguide('s) is(are) used, the non-perpendicular cross section allows a narrower, and thereby possibly a shorter, taper to be used. The narrower and/or the shorter the taper, the easier the overall design, in particular when it comes to integration and optical mode fields coupling within the waveguide.

In an embodiment, the OTDM signal has a repetition rate between 5 GHZ and 200 GHz for the optical gating signal. The repetition rate may be used for defining the frequency of the demultiplexing.

In an embodiment, the optical gating signal has a full width at half maximum larger than 250 femtoseconds.

In an embodiment, the optical gating line arrangement comprises a first gating path from the input end to the second SOE via the first SOE and a second gating path from the input end to the first SOE via the second SOE for facilitating the demultiplexing. This allows a so-called colliding (pulse) layout, where the attenuation of the optical gating signal can be compensated by providing the optical gating signal to both the first SOE and the second SOE from both directions. Here, the first SOE may be the SOE configured for first receiving the optical gating signal on the first gating path and/or the SOE configured for last receiving the optical gating signal on the second gating path. Alternatively or additionally, the second SOE may be the SOE configured for first receiving the optical gating signal on the second gating path and/or last receiving the optical gating signal on the first gating path. On both gating paths, there may be one or more SOE's of the at least two SOE's between the first SOE and the second SOE. In an embodiment, the optical length of the first gating path from the input end to the first SOE is different from the optical length of the second gating path from the input end to the second SOE. This allows symmetry breaking between the first SOE and the second SOE. The colliding layout allows more uniform and also faster gating of the SOE's.

In an embodiment, the apparatus comprises a first semiconductor optical amplifier (SOA) configured for receiving an output signal of the first SOE and for receiving the optical gating signal for timing an amplification and/or an attenuation of the output signal of the first SOE for filtering the output signal. This allows the optical gating signal to be used for further filtering a demultiplexed output signal from the corresponding SOE. Similarly, the second SOE and/or any or all other SOE's may have its own corresponding SOA, which may be different than the first SOA, for the same purpose.

In a typical embodiment, the SOA('s) may be configured for the attenuation to be smaller, or even negligible, compared to the amplification.

It is to be understood that the aspects and embodiments described above may be used in any combination with each other. Several of the aspects and embodiments may be combined together to form a further embodiment of the disclosure.

The apparatus as disclosed herein may be configured for two events to occur simultaneously at each the SOE's, or at least at the first SOE and/or at the second SOE. First event is the altering of the optical transmission properties of the corresponding SOE for the OTDM signal by the optical gating signal, e.g. the saturation of the corresponding SA, making it at least partially transparent for a period of time. Second event is an arrival of a data stream to be demultiplexed from the OTDM signal. It can thus be released after propagation through the SOE.

The present solution allows increasing maximum bandwidth of an OTDM system above 100 GHz. The optical transmission properties of the at least two SOE's may be adjusted (e.g. by optical saturation when said SOE's are SA's) for an OTDM signal transmitted through each of the at least two SOE's along a signal direction of the corresponding SOE (which may be parallel for all said SOE's) by the gating signal from a direction non-parallel with the signal direction for each of the at least two SOE's. The optical gating signal may be provided as a compressed optical pulse, which may be of high energy. The solution can be realized effectively as an integrated photonic apparatus. In the solution, a time division of the OTDM signal may correspond to an optical delay length for the at least two SOE's. For example, a difference between the first difference and the second difference, as indicated above, may correspond to a time division of the OTDM signal.

The demultiplexing can be performed without polarisation controllers and/or circulators allowing a simplified apparatus with increased bandwidth due to lower noise. Polarization need not be utilized for the multiplexing as the optical gating line arrangement and the signal paths for the OTDM signal are non-parallel at the SOE's, i.e. the apparatus does not need to utilize the optical gating signal and the OTDM signal propagating in the same direction or in opposing directions. Circulators need not be used.

BRIEF DESCRIPTION OF THE DRAWINGS

The accompanying drawings, which are included to provide a further understanding and constitute a part of this specification, illustrate examples and together with the description help to explain the principles of the disclosure. In the drawings.

Like references are used to designate equivalent or at least functionally equivalent parts in the accompanying drawings.

DETAILED DESCRIPTION

The detailed description provided below in connection with the appended drawings is intended as a description of examples and is not intended to represent the only forms in which the example may be constructed or utilized. However, the same or equivalent functions and structures may be accomplished by different examples.

Figure 1:
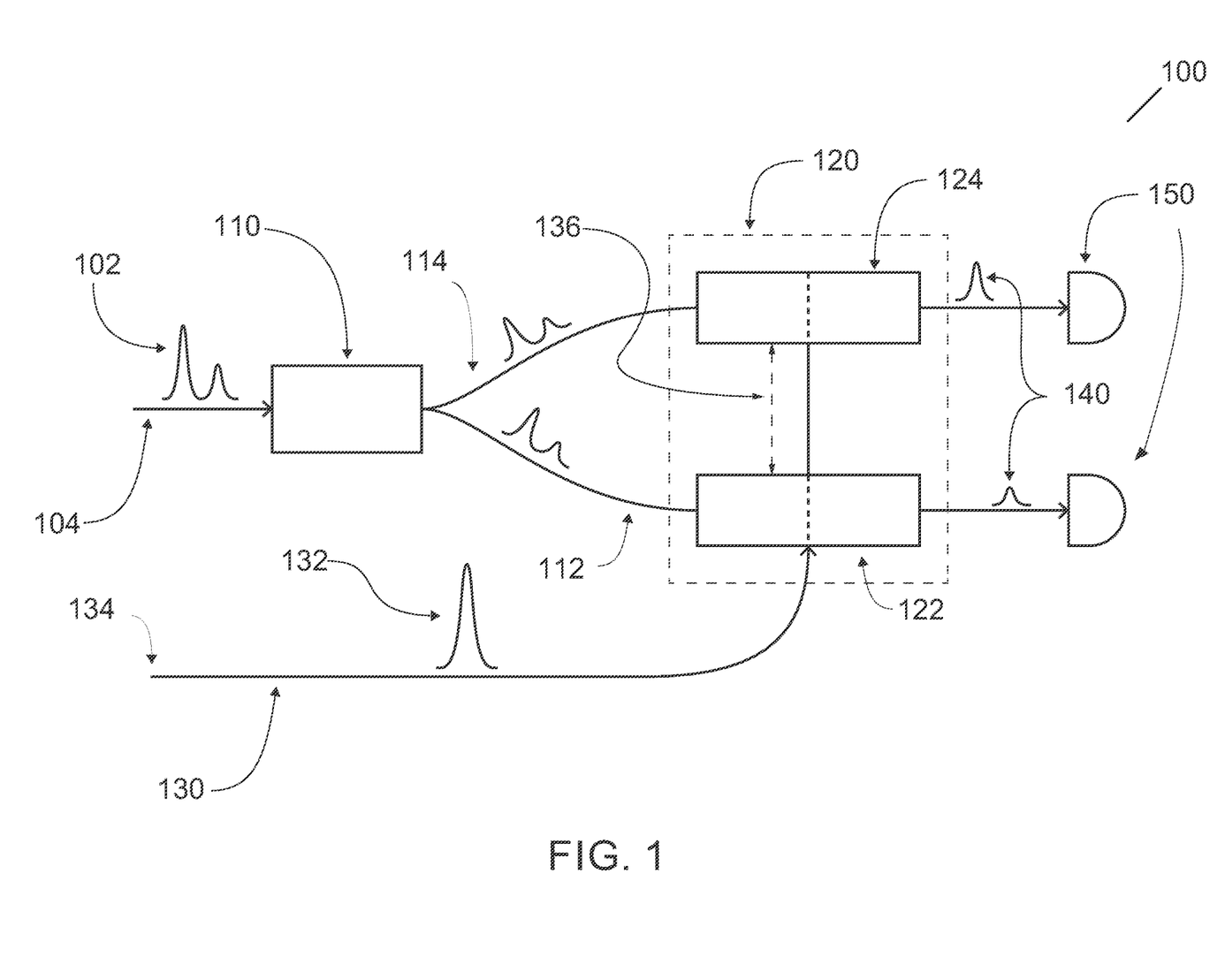
FIG. 1 schematically illustrates an apparatus according to a first example.

FIG. 1 shows an example of an apparatus 100 for optical demultiplexing. The apparatus can be provided as an optical time-division multiplexing receiver.

The apparatus is configured for receiving an optical time-domain multiplexed (OTDM) signal 102, for example along an input signal line 104 of the apparatus. The OTDM signal is a time-varying signal with multiple data streams multiplexed in a time domain. The apparatus may be configured for the optical gating signal to have a repetition rate of at least 5 GHz and/or at most 200 GHZ.

The apparatus may comprise an optical splitter 110 configured for receiving the OTDM signal and transmitting it separately along two or more signal paths (also herein "the signal paths"), comprising a first signal path 112 and a second signal path 114. The number of signal paths may be two but it may be also larger, for example three, four five or more. In an embodiment the number is at most 64. The signal paths may be of equal length but they may also be of different length. The signal paths and/or the input signal line may be formed with integrated photonic components.

The apparatus comprises two or more semiconductor optical elements (SOE's) 120 (herein also "the SOE's), comprising at least a first SOE 122 and a second SOE 124 but optionally also one or more additional SOE's, e.g. two, three or more additional SOE's. In an embodiment the number of SOE's is at most 64. The SOE's are configured for receiving the OTDM signal separately from the signal paths: the first SOE is configured to receive the OTDM signal from the first signal path, the second SOE is configured to receive the OTDM signal from the second signal path, and so on. The SOE's may be configured to function in a blocking state where they partially or fully blocking their received OTDM signal. For example, the SOE's may comprise or consist of saturable absorbers (SA's), which block their corresponding OTDM signal unless they have been saturated.

The SOE's, such as SA's, can be realized, for example, in any of the following: III-V semiconductor bulk material, quantum well material, quantum dash material and quantum dots material, e.g. material based on elongated quantum dots. The SOE's, such as SA's, can be monolithically integrated on III-V material based photonic integrated circuit (PIC). For silicon platform, a hybrid integration such as micro-transfer printing technology of SOE's such as SA's can be utilized. As an example of III-V materials, InP-based or GaAs-based platforms can be used.

The apparatus comprises an optical gating line arrangement 130 (herein also "the gating arrangement") for providing an optical gating signal 132 to the SOE's. The optical gating signal can be provided as a time-varying optical signal, for example comprising or consisting of one or more gating pulses. The apparatus may be configured for the optical gating signal to have a full width at half maximum larger than 250 femtoseconds. The apparatus is configured for the optical gating signal to change optical properties of the SOE's, for example the absorption of the SOE's such as SA's, in which case the level of absorption can control the propagation of the OTDM signal through the corresponding SOE of the SOE's. The apparatus may thus be configured for the optical gating signal to switch the state of the SOE's between the blocking state and a non-blocking state, in which the SOE's allow the OTDM signal to be transmitted therethrough. The optical gating signal may switch the SOE's from the blocking state to the non-blocking state, for example by saturating the SOE's, so that in the absence of the optical gating signal the SOE's may return to the blocking state. The SOE's, such as SA's, may thus be configured to be saturated by the optical gating signal to facilitate the demultiplexing. The apparatus may be configured for the gating signal to be synchronously delivered to the SOE's, allowing different SOE's to be switched to the non-blocking state for different parts of the OTDM signal as it changes in time. For example, the apparatus can be configured for the optical gating signal to saturate the SOE('s), such as SA('s), leading to a decrease of absorption of light that propagates through the SOE. The saturated SOE can thus become at least partially transparent for a period of time. This allows a part of the OTDM signal to traverse the SOE('s), in particular in a longitudinal dimension of the SOE('s), to emerge as an output signal 140.

The gating arrangement comprises an input end 134 for coupling to an optical gating source for receiving the optical gating signal. The gating arrangement is optically coupled to each of the SOE's for altering optical transmission properties of the corresponding SOE for the OTDM signal by the optical gating signal, e.g. by saturating the corresponding SOE. For this purpose, the gating arrangement may consist of a single gating line, e.g. arranged across the SOE's, or which may be branched from a single gating source into multiple gating lines, for example as a separate gating line to each of the SOE's.

As an example of a single gating line spanning two or more of the SOE's, the optical gating signal may be routed from the input end to the second SOE via the first SOE (or vice versa), as illustrated in FIG. 1. The first SOE and the second SOE are separated by a SOE-to-SOE optical distance 136, causing a delay for the optical gating signal. The gating arrangement may comprise a single gating line spanning all of the SOE's, in which case the apparatus is configured for the optical gating signal to arrive through said gating line at different SOE's at different times due to the optical delay due to the SOE-to-SOE optical distance between any pair of the SOE's. The apparatus may be configured for this SOE-to-SOE optical distance to be utilized for demultiplexing the OTDM signal different SOE's can be gated at different times.

While the demultiplexing may be facilitated by gating different SOE's of the SOE's at different times, it may alternatively or additionally be facilitated by providing the OTDM signal to different SOE's of the SOE's at different times. For example, the apparatus may be configured for a condition of a first difference being different from a second difference to be observed for facilitating a time delay for demultiplexing the OTDM signal. The first difference may herein correspond to a difference between an optical distance for the OTDM signal from the optical splitter to the first SOE and an optical distance for the optical gating signal from the input end to the first SOE. The second difference may herein correspond to a difference between an optical distance for the OTDM signal from the optical splitter to the second SOE and an optical distance for the optical gating signal from the input end to the second SOE. Herein, the difference between the first difference and the second difference may be referred to as "the gating delay". The apparatus may be configured for the gating delay for the first SOE and the second SOE to correspond to a time division of the OTDM signal. The apparatus may further be configured for a similarly defined gating delay for any pair of SOE's to correspond to another time division of the OTDM signal. Such gating delays may be arranged for the apparatus for demultiplexing the OTDM signal as a whole to two, three four, five or more channels. In an embodiment, to 64 channels at most.

As the apparatus is configured for time-dependent gating of the OTDM signal at different SOE's of the SOE's, each SOE can provide the output signal 140 as a demultiplexed portion of the OTDM signal. Each portion can correspond to a separate data stream of the original OTDM signal. In the illustration of FIG. 1, the output signal from the first SOE 122 corresponds to the first part of the OTDM signal 102 and the output signal from the second SOE 124 corresponds to the latter part of the OTDM signal 102 since the optical distance from the input end 134 to the first SOE for the optical gating signal is smaller than the optical distance from the input end to the second SOE for the optical gating signal. The optical gating signal can thus first "open" the first SOE and thereafter the second SOE.

The apparatus may comprise two or more detectors 150 (herein also "the detectors") for detecting the output signals 140 from the SOE's. Each of the detectors may be coupled to different SOE of the SOE's. The detectors may thus be configured to receive the demultiplexed portions of the OTDM signal, where each of the detectors may receive a different demultiplexed portion of the OTDM signal.

Any or all of the components of the apparatus may be integrated photonic components. In particular, the gating arrangement and the SOE's may comprise or consist of integrated photonic components.

Each of the SOE's has a length dimension (i.e. the longitudinal dimension) and a width dimension. In an embodiment, each of the SOE's, or at least the first SOE and/or the second SOE, has a length of at least one millimeter in the length dimension. In a specific example, each of the SOE's, or at least the first SOE and/or the second SOE, has an active region of length of 10-20 microns in the length dimension and/or a width of 1-5 microns, e.g. 3 microns, in the width dimension. The apparatus may be configured for the optical gating signal to be focused on the active region for the altering of the optical transmission properties of the SOE('s). In an embodiment, the SOE's, or at least the first and the second SOE, are parallel so that their length dimensions are parallel to each other, as illustrated. Each of the at least two SOE's can be configured for the OTDM signal to be received along the length dimension of the corresponding SOE. Also, each of the at least two SOE's can be configured for the optical gating signal to be provided across the width dimension of the corresponding SOE, i.e. non-parallel to the length dimension. In an embodiment, the SOE's, or at least the first and/or the second SOE, are configured for the optical gating signal to be provided perpendicular to the length dimension of the corresponding SOE('s), as illustrated. It can thus be propagated across the corresponding SOE's in a crossing direction perpendicular to the length dimension of the corresponding SOE's (in particular in a straight line). Alternatively or additionally, it can be propagated between any or all pairs of the SOE's, such as the first SOE and the second SOE across a gating direction (in particular along a gating direction such as a straight line) perpendicular with respect to the length dimension of the corresponding SOE's.

The length dimension of any or all the SOE's may be larger than the width dimension, in particular in terms of optical length. The optical gating signal may be spread to interact with an extended width of any or all of the SOE's, in particular the first SOE and/or the second SOE, in the width dimension.

Figure 2:
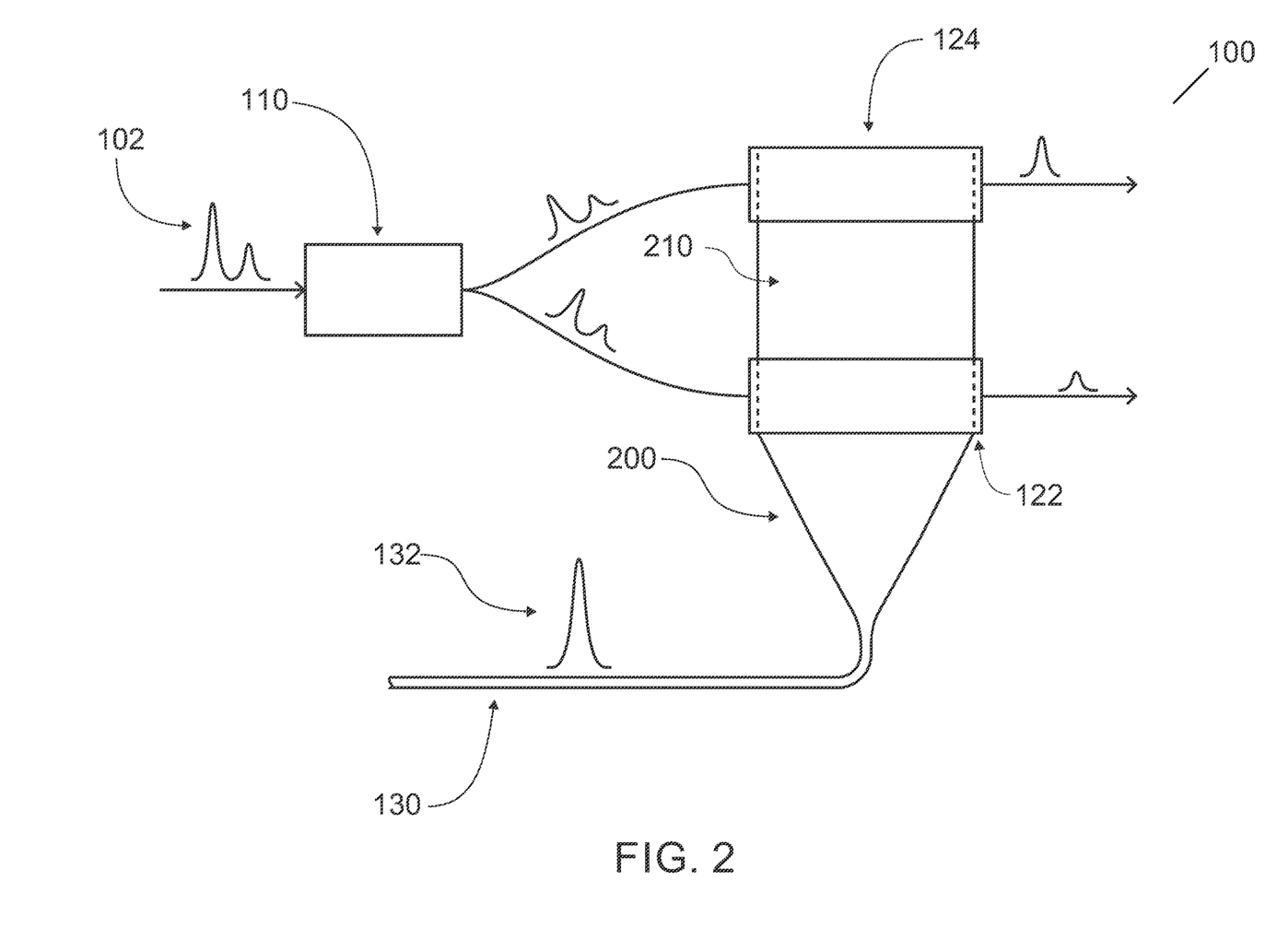
FIG. 2 schematically illustrates an apparatus according to a second example.

FIG. 2 illustrates an example of the apparatus 100, where the gating arrangement 130 comprises a first coupling portion, such as a waveguide coupling portion, for coupling the optical gating signal 132 to the first SOE 122 and a second coupling portion 210, such as a waveguide coupling portion, for coupling the optical gating signal to the second SOE 124. The first coupling portion and/or the second coupling portion may comprise a tapered waveguide 200 for spatially spreading the optical gating signal incident on the corresponding SOE. In the illustrated example, the tapered waveguide is on the first coupling portion. The optical gating signal may be spread by the tapered waveguide at an initial SOE, such as the first SOE and/or the second SOE, of the SOE's. The optical gating signal may be carried as a spread signal across any or all of the SOE's. The gating arrangement could also comprise a first tapered waveguide for spatially concentrating the optical gating signal outgoing from the first SOE and/or a second tapered waveguide for spatially concentrating the optical gating signal outgoing from the second SOE. However, in the illustrated example, the optical gating signal outgoing from the first SOE is not concentrated. This illustrates also, how the gating arrangement may be configured for having an extended waveguide between two SOE's, which can allow omitting further tapered waveguides for spatially spreading and/or concentrating the optical gating signal any or all pairs of the SOE's.

Figure 3:
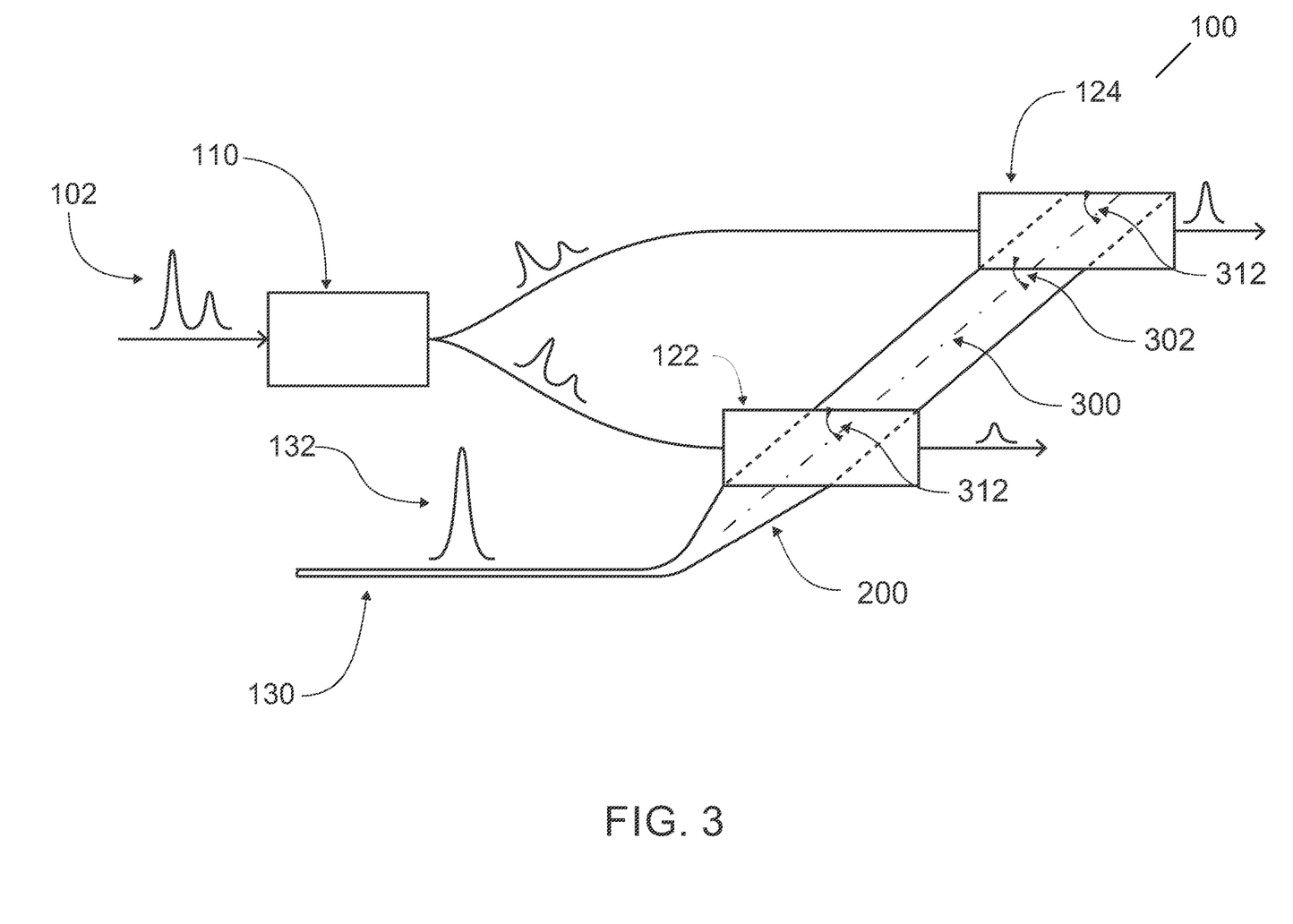
FIG. 3 schematically illustrates an apparatus according to a third example.

FIG. 3 illustrates an example of the apparatus 100, where the gating arrangement is configured for the optical gating signal to be propagated between any or all pairs of SOE's, such as from the first SOE 122 to the second SOE 124 (or vice versa), across a gating direction 300 (in particular along the gating direction, such as a straight line). The apparatus may be configured to propagate across the gating direction along a straight line from one SOE to another or along any type of path, such as a curved line, as long as the starting point and the end point of the path are at the two SOE's in accordance with the gating direction. As illustrated above with reference to FIG. 1, the gating direction may be perpendicular but it may also be non-perpendicular with respect to the length dimension of the corresponding SOE's, such as the first SOE and/or the second SOE. In particular, the gating direction may be at an angle 302 of at least 45 degrees and at most 135 degrees with respect to the length dimension of the corresponding SOE('s). In all of these cases, the angle may be smaller than 85 or larger than 95 degrees, which allows enhancing tilt with respect to perpendicular gating and thereby the optical distance between the corresponding SOE's. The gating direction may continue as a straight line across all the SOE's, e.g. for three, four, five or more SOE's.

Alternatively or additionally, the gating arrangement may be configured for the optical gating signal to be propagated across any or all of the SOE's, such as the first SOE and/or the second SOE, across a crossing direction 310 (in particular along a crossing direction such as a straight line). As illustrated above with reference to FIG. 1, the crossing direction may be perpendicular but it may also be non-perpendicular with respect to the length dimension of the corresponding SOE('s). In particular, the crossing direction may be at a crossing angle 312 of at least 45 degrees and at most 135 degrees with respect to the length dimension of the corresponding SOE('s). In all of these cases, the crossing angle may be smaller than 85 degrees or larger than 95 degrees, which allows enhancing tilt with respect to perpendicular gating and thereby the optical distance within the corresponding SOE('s). The crossing direction may be the same for all the SOE's, e.g. for three, four, five or more SOE's.

The crossing direction may be the same as the gating direction for any or all of the SOE's, in particular for the first and/or the second SOE, as illustrated. Further, regardless of whether said directions are perpendicular or non-perpendicular, the gating arrangement may comprise the tapered waveguide 200 as introduced above, e.g. at the first coupling portion and/or at the second coupling portion. The tapered waveguide may have an angled tapering along the gating direction and/or the crossing direction, as illustrated in FIG. 3.

Figure 4:
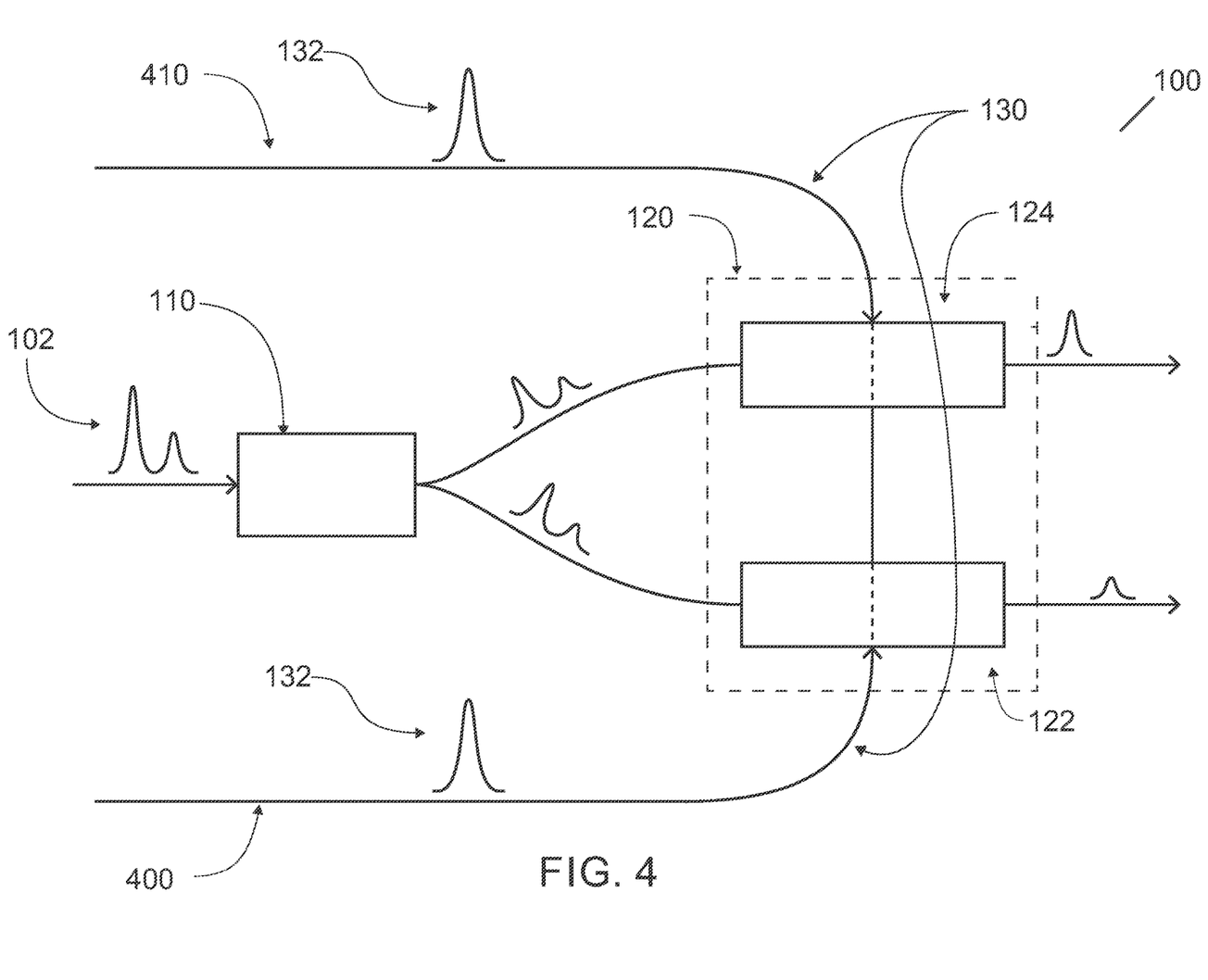
FIG. 4 schematically illustrates an apparatus according to a fourth example.

FIG. 4 illustrates an example of the apparatus 100, where the gating arrangement 130 is arranged for a colliding layout for the optical gating signal. The gating arrangement may still have a single common input end (not illustrated), which may be arranged to couple to the optical gating source for receiving the optical gating signal 132. However, the gating arrangement now comprises at least two (optical) gating paths: a first (optical) gating path 400 from the input end to the second SOE via the first SOE and a second (optical) gating path 410 from the input end to the first SOE via the second SOE for facilitating the demultiplexing. The SOE's 120 may, for example, be arranged in the colliding layout so that the additional SOE's are between the first SOE and the second SOE for the first and the second gating paths, i.e. the first SOE is the initial SOE on the first gating path and the second SOE is the last SOE on the first gating path with the additional SOE's after the first SOE but before the second SOE on the first gating path. Similarly, the second SOE may be the initial SOE on the second gating path and the first SOE the last SOE on the second gating path with the additional SOE's after the second SOE but before the first SOE on the second gating path. The first and the second gating paths, or sections thereof, between the first SOE and the second SOE may be physically separate paths, e.g. on separate waveguides, and/or physically identical paths in opposite direction, e.g. on the same waveguide. The optical length of the first and the second gating paths, or sections thereof, between the first SOE and the second SOE may thus be the same. The optical length of the first gating path from the input end to the first SOE may in any case be different from the optical length of the second gating path from the input end to the second SOE.

Figure 5:
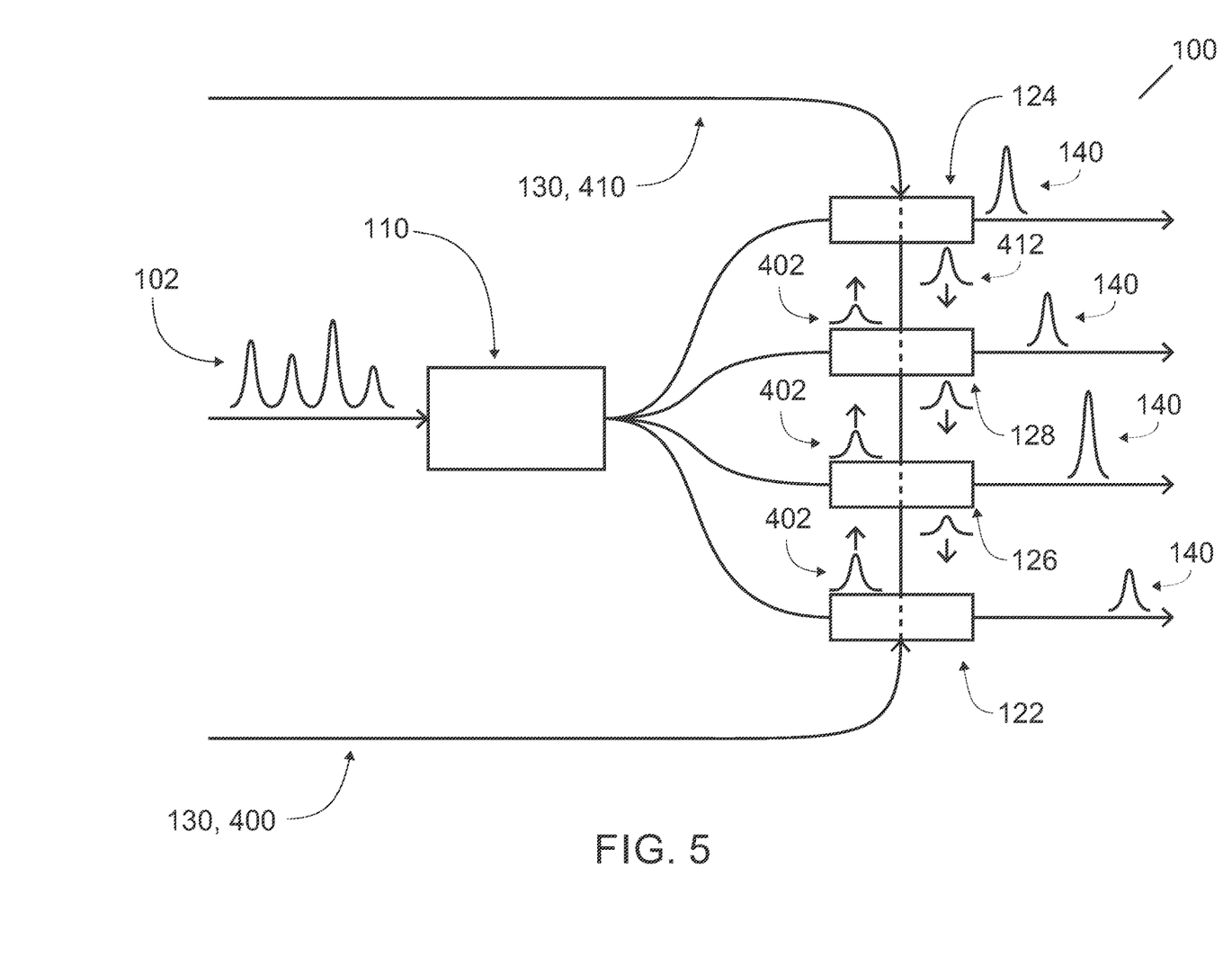
FIG. 5 schematically illustrates an apparatus according to a fifth example.

FIG. 5 illustrates a further example of the apparatus 100, where the gating arrangement 130 is arranged for a colliding layout for the optical gating signal. In this example, there are one or more additional SOE's, e.g. the third SOE 126 and the fourth SOE 128, as illustrated. The additional SOE's are arranged between the first SOE and the second SOE for the first gating path 400 and the second gating path 410. The illustration shows, how the optical gating signal attenuates 402 on the first gating path as it travels through the SOE's. Similarly, it attenuates 412 on the second gating path but in the opposite direction. Because of the colliding layout the combined strength (e.g. in terms of total amplitude) of the optical gating signal from the first gating path and from the second gating path can be maintained uniform or substantially uniform for each of the SOE's. Timing of the optical gating signal may also here be adjusted so that each of the SOE's provides a different data stream from the OTDM signal as an output signal. For this purpose, the optical length of the first gating path from the input end to the first SOE may different from the optical length of the second gating path from the input end to the second SOE.

Figure 6:
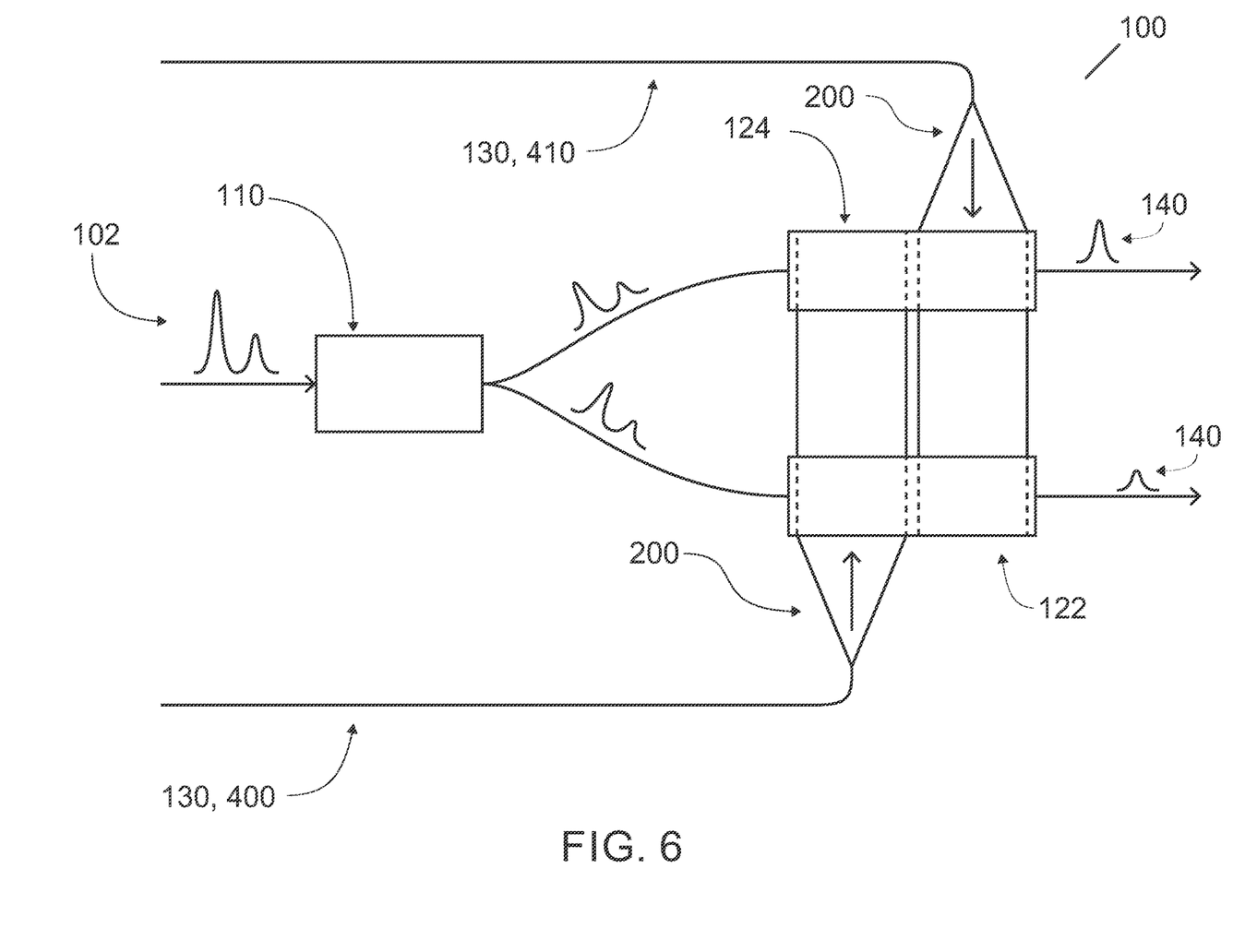
FIG. 6 schematically illustrates an apparatus according to a sixth example.

FIG. 6 illustrates an example of the apparatus 100, which example can also be considered as the colliding layout as described above, or a variation thereof. In this example, the first gating path 400 and the second gating path 410 are separate, also between the SOE's, e.g. as separate waveguides. Regardless of whether they are separate or not, the first gating path and/or the second gating path may comprise the tapered waveguide 200, as described above, for spatially spreading the optical gating signal incident on the corresponding SOE, e.g. the first SOE and/or the second SOE. The optical gating signal may be spread by the tapered waveguide at the initial SOE, such as the first SOE and/or the second SOE, at the first gating path and/or at the second gating path. The optical gating signal may be carried as a spread signal across any or all of the SOE's on the first gating path and/or the second gating path. Separate waveguides allow the tapered waveguide 200 to be shorter as the width of the tapered waveguide is decreased. This layout allows reducing the physical size of the tapered waveguide(s).

Figure 7:
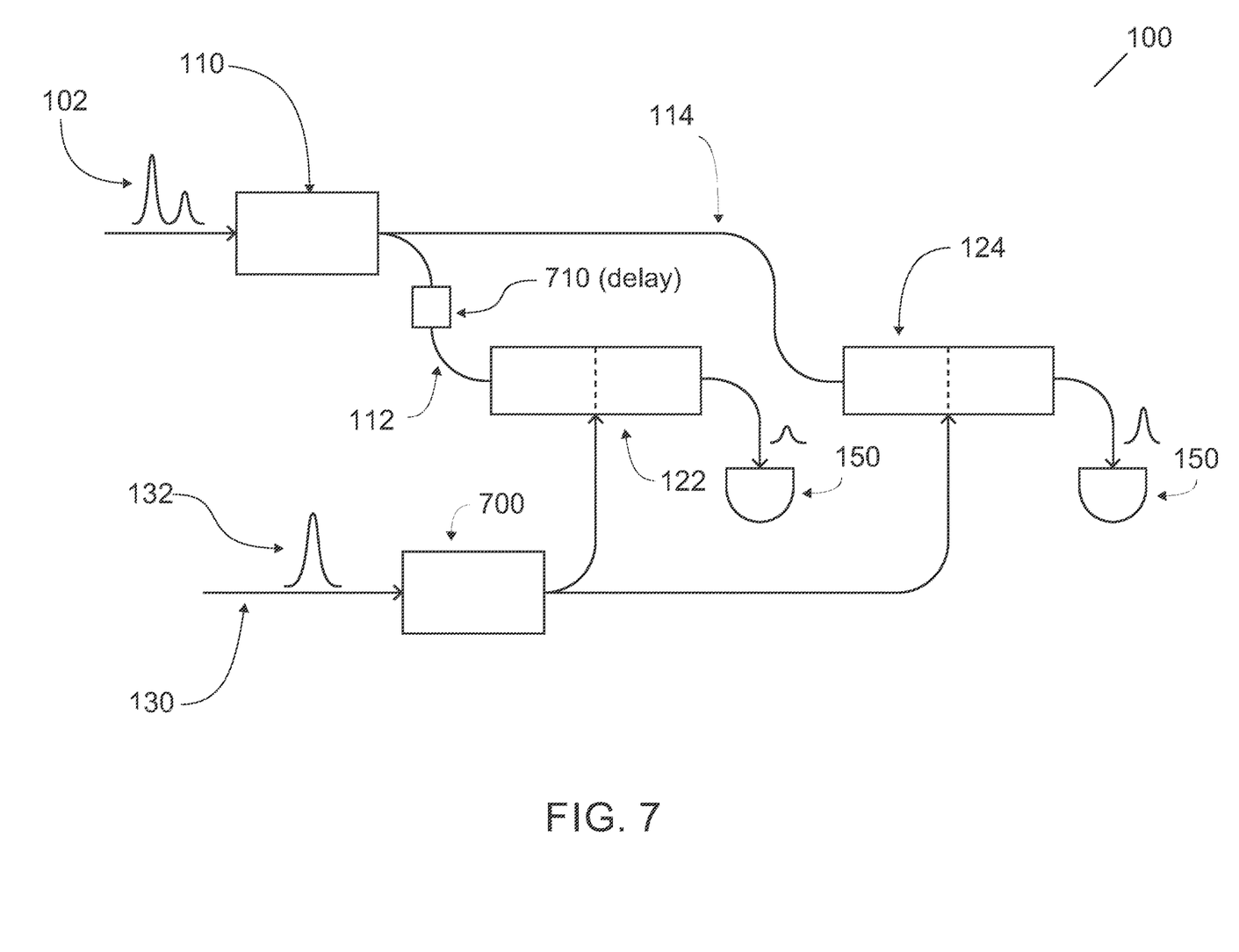
FIG. 7 schematically illustrates an apparatus according to a seventh example, and FIG. 8 schematically illustrates an apparatus according to an eighth example.

FIG. 7 illustrates an example of the apparatus 100, where the gating arrangement comprises one or more optical splitters 700 (herein also "the gating splitters") for splitting the optical gating signal into separate gating paths. The gating splitters may be utilized for the colliding layouts described above but it may also be utilized when the optical gating signal is separately routed to one or more SOE's of the SOE's. The optical gating signal may also be separately routed to all of the SOE's, in which case delays of the optical gating signal for different SOE's may be adjusted by different optical lengths of paths for the optical gating signal from the input end to the corresponding SOE and/or by one or more optical delay elements.

Figure 8:
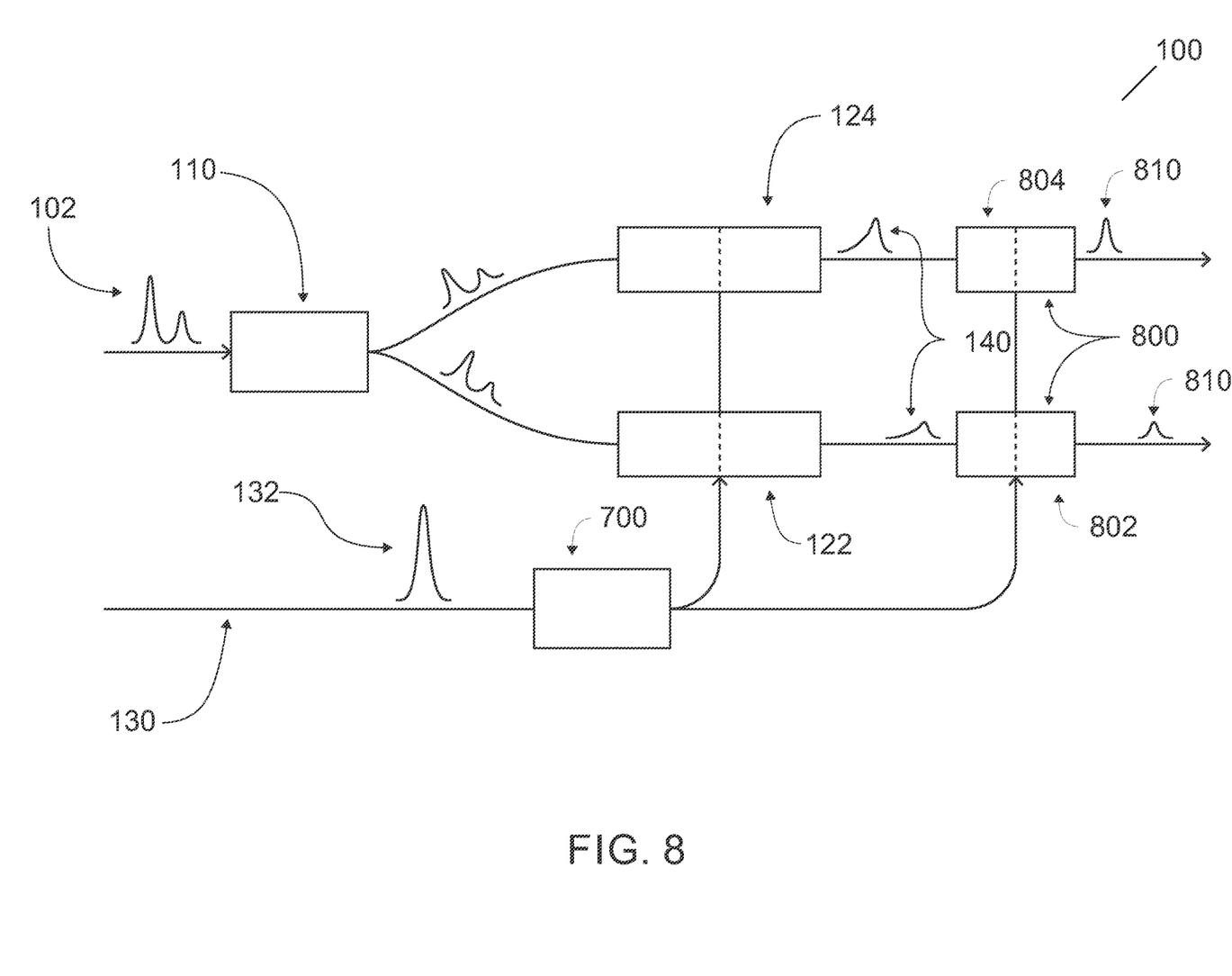

It is also illustrated that one or more optical delay elements 710 may be provided on any or all of the signal paths from the optical splitter configured to receive the OTDM signal to the SOE's, e.g. on the first signal path 112 and/or the second signal path 114. However, the delay may also be accomplished by an increased length of optical path. The signal paths, such as the first signal path and the second signal path, may correspond to same or different optical distances for the OTDM signal, where the optical distances may depend on the length of the corresponding signal path and, optionally, on one or more optical delay elements provided on the signal path. In practice, delay compensation for the OTDM signal may be introduced by adjusting delays of the gating arrangement and/or by intentional elongation of one or more signal paths for the OTDM signal, e.g. the first signal path and/or the second signal path, which can also make them of equal length FIG. 8 illustrates an example of the apparatus, where the apparatus 100 comprises one or more semiconductor optical amplifiers (SOA's), such as a first SOA 800 and/or a second SOA, each configured for receiving an output signal 140 of an SOE of the SOE's. The first SOA may be configured for receiving the output signal of the first SOE and/or the second SOA may be configured for receiving the output signal of the second SOE, and so on. Each of the one or more SOA's may be also configured for receiving the optical gating signal 132 for timing an amplification and/or an attenuation of the output signal of the corresponding SOE, e.g. the first SOA for the first SOE and so on, for filtering the output signal. The optical gating signal may be separated for the corresponding SOA('s) with one or more of the gating splitters 700. The optical gating signal may be routed to the SOA's separately or through one or more SOA's, for example to the second SOA via the first SOA (or vice versa), as illustrated. The apparatus may be configured for each SOA to filter the output signal of its corresponding SOE by relatively amplifying one or more peaks of the output signal, e.g. by amplifying the one or more peaks and/or by attenuating the output signal at one or more regions outside the one or more peaks. This allows providing a single data stream of the OTDM signal with improved clarity as a filtered output signal 810, e.g. by suppressing a tail from the output signal 140, as illustrated. This can be achieved by fast oversaturation of the SOA with the optical gating signal. The SOA('s) can be configured for performing the filtering based on the optical gating signal since the same optical gating signal is routed to the corresponding SOE (from the same or different branch of the gating arrangement) thereby indicating timing of the output signal. The apparatus may be configured for the timing of the optical gating signal at the SOE('s) and their corresponding SOA('s) to match for filtering the output signal to the filtered output signal.

All the features described above with reference to a specific example may be featured also in any other example.

The different functions discussed herein may be performed in a different order and/or concurrently with each other.

Although the subject matter has been de-scribed in language specific to structural features and/or acts, it is to be understood that the subject matter for which protection is sought is defined in the appended claims and not necessarily limited to the specific features or acts described above. Any example disclosed herein may be combined with another example unless explicitly disallowed.

The term 'comprising' is used herein to mean including the method, blocks or elements identified, but that such blocks or elements do not comprise an exclusive list and a method or apparatus may contain additional blocks or elements.

Numerical descriptors such as 'first', 'second', and the like are used in this text simply as a way of differentiating between parts that otherwise have similar names. The numerical descriptors are not to be construed as indicating any particular order, such as an order of preference, manufacture, or occurrence in any particular structure.

The invention claimed is:

1. An apparatus for optical demultiplexing comprising:
   an optical splitter configured for receiving an optical time-domain multiplexed (OTDM) signal and transmitting the OTDM signal separately along a first signal path and a second signal path;
   at least two semiconductor optical elements, comprising a first SOE configured for receiving the OTDM signal from the first signal path and a second SOE configured for receiving the OTDM signal from the second signal path; and
   an optical gating line arrangement comprising an input end for coupling to an optical gating source for receiving an optical gating signal, the optical gating line arrangement being optically coupled to each of the at least two SOE's for altering optical transmission properties of the corresponding SOE for the OTDM signal by the optical gating signal;
   wherein a first difference is different from a second difference to facilitate a time delay for demultiplexing the OTDM signal, the first difference corresponding to a difference between an optical distance for the OTDM signal from the optical splitter to the first SOE and an optical distance for the optical gating signal from the input end to the first SOE and the second difference corresponding to a difference between an optical distance for the OTDM signal from the optical splitter to the second SOE and an optical distance for the optical gating signal from the input end to the second SOE; and
   wherein each of the at least two SOE's has a length dimension and a width dimension, and each of the at least two SOE's is configured for the OTDM signal to be received along the length dimension of the corresponding SOE and the optical gating signal to be provided across the width dimension of the corresponding SOE.

2. The apparatus of claim 1, wherein the at least two SOE's are saturable absorbers (SA) configured to be saturated by the optical gating signal to facilitate the demultiplexing.

3. The apparatus claim 1, wherein the length dimension of the first SOE corresponds to a first optical length and the width dimension of the first SOE corresponds to a second optical length, the first optical length being larger than the second optical length.

4. The apparatus of claim 1, wherein the optical gating signal is routed from the input end to the second SOE via the first SOE.

5. The apparatus of claim 1, wherein the optical gating line arrangement and the at least two SOE's comprises integrated photonic components.

6. The apparatus of claim 1, wherein the at least two SOE's comprises at least 3 and at most 64 SOE's, each configured for providing a separate channel for the OTDM signal.

7. The apparatus of claim 1, wherein the optical gating line arrangement comprises a first waveguide coupling portion for coupling the optical gating signal to the first SOE and a second waveguide coupling portion for coupling the optical gating signal to the second SOE, wherein the first waveguide coupling portion and/or the second waveguide coupling portion comprises a tapered waveguide for spatially spreading the optical gating signal incident on the corresponding SOE.

8. The apparatus of claim 1, wherein the optical gating line arrangement comprises a first tapered waveguide for spatially concentrating the optical gating signal outgoing from the first SOE and/or a second tapered waveguide for spatially concentrating the optical gating signal outgoing from the second SOE.

9. The apparatus of claim 1, wherein the length dimension of the first SOE is parallel with the length dimension of the second SOE.

10. The apparatus of claim 1, wherein the optical gating line arrangement is configured for the optical gating signal to be propagated from the first SOE to the second SOE across a gating direction, the gating direction being non-perpendicular with respect to the length dimension of the first SOE and/or the length dimension of the second SOE.

11. The apparatus claim 1, wherein the optical gating line arrangement is configured for the optical gating signal to be propagated from the first SOE to the second SOE across a gating direction, the gating direction being perpendicular with respect to the length dimension of the first SOE and/or the length dimension of the second SOE.

12. The apparatus of claim 1, wherein the optical gating line arrangement is configured for the optical gating signal to be propagated across the first SOE and/or the second SOE across a crossing direction, the crossing direction being non-perpendicular with respect to the length dimension of the first SOE and/or the length dimension of the second SOE.

13. The apparatus of claim 1, wherein the optical gating line arrangement is configured for the optical gating signal to be propagated across the first SOE and/or the second SOE across a crossing direction, the crossing direction being perpendicular with respect to the length dimension of the first SOE and/or the length dimension of the second SOE.

14. The apparatus of claim 1, wherein the OTDM signal has a repetition rate between 5 GHz and 200 GHz for the optical gating signal.

15. The apparatus of claim 1, wherein the optical gating signal has a full width at half maximum larger than 250 femtoseconds.

16. The apparatus of claim 1, wherein the optical gating line arrangement comprises a first gating path from the input end to the second SOE via the first SOE and a second gating path from the input end to the first SOE via the second SOE for facilitating the demultiplexing.

17. The apparatus of claim 1, wherein the optical length of the first gating path from the input end to the first SOE is different from the optical length of the second gating path from the input end to the second SOE.

18. The apparatus of claim 1, comprising a first semiconductor optical amplifier (SOA) configured for receiving an output signal of the first SOE and for receiving the optical gating signal for timing an amplification of the output signal of the first SOE for filtering the output signal.

* * * * *